United States Patent
Koga et al.

(10) Patent No.: US 8,923,415 B2
(45) Date of Patent: Dec. 30, 2014

(54) COMMUNICATION APPARATUS AND COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1838 days.

(21) Appl. No.: 11/518,260

(22) Filed: Sep. 11, 2006

(65) Prior Publication Data

US 2007/0121930 A1    May 31, 2007

(30) Foreign Application Priority Data

Sep. 16, 2005    (JP) .............................. P. 2005-270157

(51) Int. Cl.
| H04B 3/00 | (2006.01) |
| H04L 25/00 | (2006.01) |
| H04B 3/54 | (2006.01) |

(52) U.S. Cl.
CPC ........ *H04B 3/542* (2013.01); *H04B 2203/5425* (2013.01)
USPC ........................ 375/257; 379/413.03; 455/402

(58) Field of Classification Search
USPC ........................ 375/257; 379/413.03; 455/402
See application file for complete search history.

(56) References Cited

U.S. PATENT DOCUMENTS

| 5,510,829 | A | * | 4/1996 | Sugiyama et al. | 348/14.01 |
| 5,838,824 | A | * | 11/1998 | Narikawa et al. | 382/232 |
| 6,256,682 | B1 | * | 7/2001 | Gudan et al. | 710/14 |
| 6,442,129 | B1 | * | 8/2002 | Yonge et al. | 370/204 |
| 6,445,087 | B1 | | 9/2002 | Wang | |
| 7,023,324 | B2 | | 4/2006 | Kodama | |
| 7,035,408 | B2 | | 4/2006 | Antoine | |
| 7,142,094 | B1 | * | 11/2006 | Davidow et al. | 370/401 |
| 7,480,336 | B2 | | 1/2009 | Park | |
| 7,498,935 | B2 | | 3/2009 | Kodama | |
| 7,502,469 | B2 | | 3/2009 | Antoine | |
| 7,800,491 | B2 | | 9/2010 | Kodama | |
| 2002/0090023 | A1 | | 7/2002 | Kondou et al. | |
| 2003/0043028 | A1 | | 3/2003 | Torikai | |
| 2003/0156014 | A1 | * | 8/2003 | Kodama et al. | 340/310.01 |
| 2004/0004944 | A1 | | 1/2004 | Petrus | |

(Continued)

FOREIGN PATENT DOCUMENTS

| JP | 2001-358693 | 12/2001 |
| JP | 2002344417 | 11/2002 |

(Continued)

OTHER PUBLICATIONS

Japanese Office Action dated Aug. 23, 2011.

(Continued)

*Primary Examiner* — Curtis Odom
(74) *Attorney, Agent, or Firm* — Seed IP Law Group PLLC

(57) ABSTRACT

A transmitted digital signal from a digital signal processor is converted into an analog signal at an analog circuit, and then transmitted from transmission lines via a communication transformer. A communication apparatus has a plurality of communication modes that perform communication in different communication ranges. A controller in the digital signal processor changes an output level of the transmitted signal according to the communication modes. More specifically, the controller detects communication quality of the transmitted signal and lowers the output level of the transmitted signal within a range where the detected communication quality does not fall below predetermined quality.

16 Claims, 9 Drawing Sheets

(56) References Cited

U.S. PATENT DOCUMENTS

| | | |
|---|---|---|
| 2004/0037311 A1 | 2/2004 | Willes |
| 2004/0131123 A1 | 7/2004 | Maki et al. |
| 2005/0037722 A1 | 2/2005 | Koga et al. |
| 2005/0063314 A1 | 3/2005 | Sahinoglu |
| 2005/0078775 A1* | 4/2005 | Hellmark et al. ............ 375/345 |
| 2005/0099937 A1 | 5/2005 | Oh |
| 2006/0045193 A1* | 3/2006 | Stolpman et al. ............ 375/260 |
| 2006/0128318 A1 | 6/2006 | Agarossi |
| 2008/0095253 A1 | 4/2008 | Koga et al. |
| 2010/0226446 A1 | 9/2010 | Koga et al. |

FOREIGN PATENT DOCUMENTS

| | | |
|---|---|---|
| JP | 2003-218831 | 7/2003 |
| JP | 2004-159324 | 6/2004 |
| JP | 2004-193888 | 7/2004 |
| JP | 2005-057644 | 3/2005 |
| JP | 2005-151567 | 6/2005 |
| JP | 2005-176303 | 6/2005 |
| JP | 2005-532739 | 10/2005 |
| JP | 2005312009 | 11/2005 |
| JP | 2005-538642 | 12/2005 |
| JP | 2006014294 | 1/2006 |
| JP | 2007-525045 | 8/2007 |
| WO | 2004/077685 | 9/2004 |
| WO | 2004/077728 | 9/2004 |

OTHER PUBLICATIONS

European Office Action dated Jan. 23, 2012.

* cited by examiner

COMMUNICATION APPARATUS AND COMMUNICATION METHOD

BACKGROUND

1. Field of the Invention

An embodiment presented below relates to a communication apparatus and a communication method that perform communication through a power line.

2. Description of Related Art

A transmission system that uses a plurality of sub-carriers, including an OFDM (Orthogonal Frequency Division Multiplexing) system and the like, has a significant advantage that provides quality communication even on a transmission line under an adverse condition. Thus, such transmission system is used not only in wireless communication, but also in wired communication, including power line communication and the like (e.g., Japanese Patent Laid-open Publication 2002-344417).

The wired communication using the above-described multi-carrier can also be applied to communication between AV (Audio Video) devices. For example, a television set and a DVD recorder transmit and receive an AV signal over the wired communication using the multi-carrier. The communication between the AV devices, however, is most likely stream communication between specific devices, and transmission volume is substantially high. When a device other than the AV devices is also connected to a wired communication network using the multi-carrier, the device is unable to use the network while the transmission is being performed between the AV devices, and thus the network is not used efficiently.

SUMMARY

The embodiment presented below is provided to overcome the above-described shortcomings. An object of the embodiment is to provide a multi-carrier communication apparatus, an integrated circuit, and a multi-carrier communication method that enable efficient use of a network in communication using a plurality of carriers.

The communication apparatus transmits a signal to another communication apparatus through a power line. The communication apparatus includes, a digital circuit that modulates a digital data into the signal having a predetermined output level, an analog circuit that converts the signal from a digital format to an analog format and transmitting the signal and an integrated circuit that controls at least one of the digital circuit and the analog circuit to lower the predetermined output level of the signal in accordance with an input signal. Thereby, a communication of a certain communication apparatus can apparently be separated from the network, thus allowing another communication to be performed on the same transmission line and achieving efficient use of the network.

The communication method that transmits a signal to another communication apparatus through a power line. The communication method includes, modulating a digital data into the signal having a predetermined output level, converting, from a digital format to an analog format, the signal modulated from the digital data, transmitting the signal converted to the analog format and lowering the predetermined output level of the signal in accordance with an input signal. Thereby, a communication of a certain communication apparatus can apparently be separated from the network, thus allowing another communication to be performed on the same transmission line and achieving efficient use of the network.

DETAILED DESCRIPTION

The embodiment is explained in the following, with reference to the above-described drawings.

Figure 1:
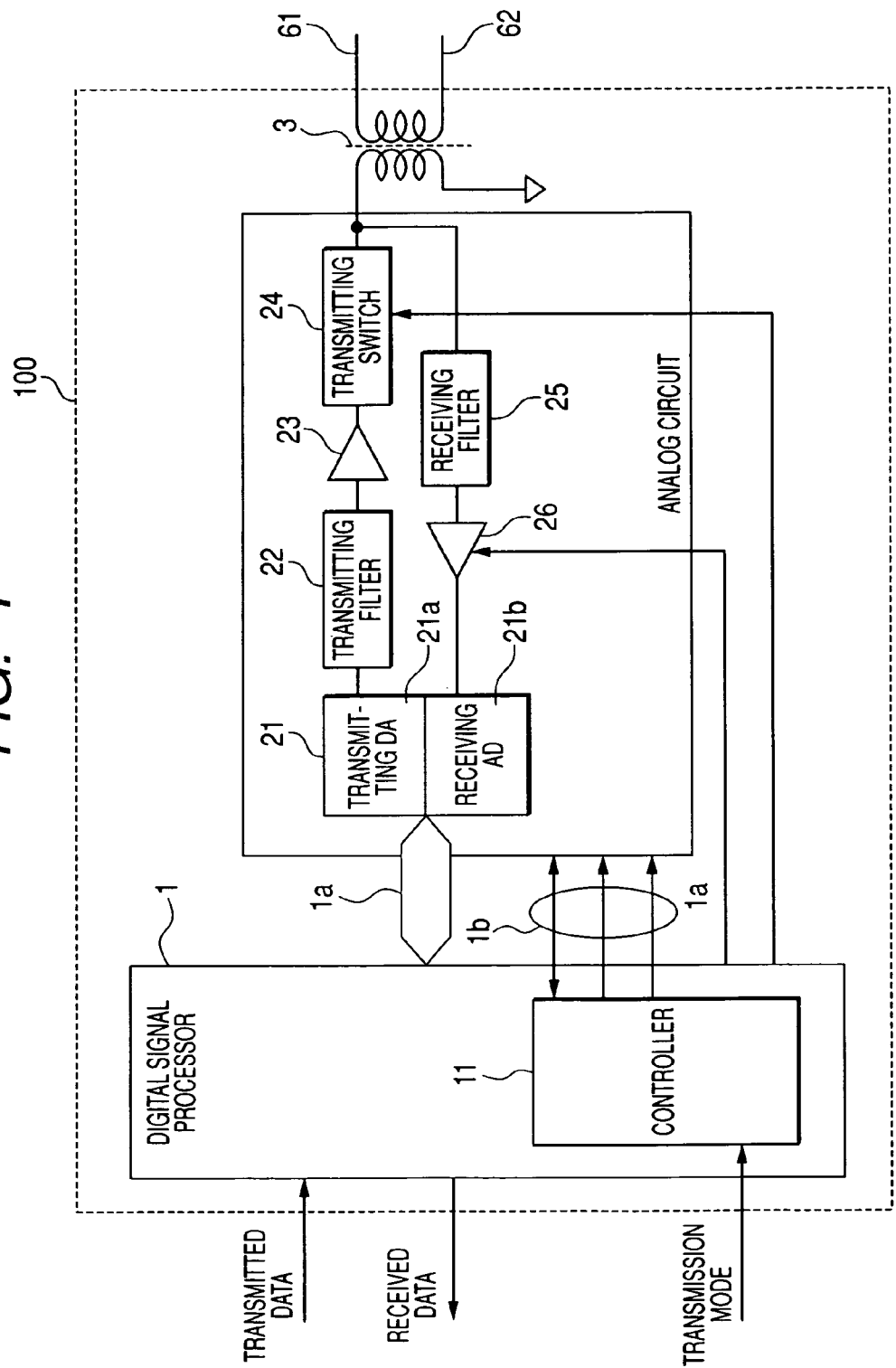
FIG. 1 illustrates a general configuration of a multi-carrier communication apparatus according to an embodiment.

FIG. 1 illustrates a general configuration of a multi-carrier communication apparatus according to the embodiment. In FIG. 1, multi-carrier communication apparatus 100 communicates via a transmission line that includes a pair of conductors 61 and 62 of a power line, which is an example of a wired transmission line. Namely, multi-carrier communication apparatus 100 performs power line communication via the pair of conductors 61 and 62. A frequency band used for the power line communication includes a shortwave band (3 to 30 MHz) and the like. The shortwave band is 2 to 30 MHz in Japan, and 4 to 28 MHz in the United States, for example. Multi-carrier communication apparatus 100 in FIG. 1 includes digital signal processor 1, analog circuit 2, and communication transformer 3, each of which has a plurality of communication modes to communicate in different communication ranges.

Digital signal processor 1 includes at least one integrated circuit, such as, for example, a digital LSI and the like. Digital signal processor 1 modulates transmitted digital data and generates a transmitted digital signal as a multi-carrier signal. The multi-carrier signal to be transmitted is simply referred to as a "transmitted signal" in the description below. Digital signal processor 1 further demodulates a received digital signal; generates received digital data; and controls a signal path, a gain, and the like of each component of analog circuit 2. Transmitted digital signal 1a is sent to AD/DA conversion circuit 21 of analog circuit 2, which includes an analog chip and a discrete part. Received digital signal 1a is input to AD/DA conversion circuit 21. A variety of control signals and status signals 1b are also input to and output from analog circuit 2. Digital signal processor 1 performs modulation and demodulation using a plurality of sub-carriers in, for example, OFDM (Orthogonal Frequency Division Multiplexing) that employs wavelet transform. The wavelet transform in communication generally uses a cosine modulated filter bank. OFDM does not need to use the wavelet transform, but may use FFT (fast Fourier transform).

Digital signal processor 1 includes controller 11, which provides control over the entire multi-carrier communication apparatus, including transmitted output control that changes an output level (e.g., a voltage or a power) of the transmitted signal according to a set communication mode. The transmitted output may be controlled by changing a gain of transmitting amplifier 23 or by changing a gain in generation of the transmitted digital data, which is computed by digital signal processor 1. When changing the output level of the transmitted signal, controller 11 may also change a phase vector, which shows a phase rotation amount of each of the sub-carriers. Further, controller 11 may fix a tone map at the same time when lowering the output level of the transmitted signal.

In addition to the function to control the output level of the transmitted signal as the transmitted output controller, controller 11 has a function to detect communication quality of the transmitted signal as a communication quality detector. Controller 11 may further include a function as a phase vector controller, which changes the phase vector that shows the phase of the transmitted signal; and a function as a modulation scheme controller, which fixes a modulation scheme of the transmitted signal. Descriptions will follow on the detection of the communication quality, the change of the phase vector, and the fixing of the modulation scheme.

Switch 20 (refer to FIGS. 4 and 6) may be used to switch the communication mode. Switch 20, which is an example of an input signal receiver that receives an input signal, can be achieved in form of hardware or software. To switch on hardware, a button switch, including a membrane switch and a mechanical switch, or a DIP switch is used. To switch on software, a setup screen on a device connected to the multi-carrier communication apparatus, such as a television set, is used. When switching on software, it may be performed at the same time to change a phase vector, to change a modulation scheme, or to switch a network key. Further, the communication mode may also be switched in association with a connection status with another multi-carrier communication apparatus. For instance, the multi-carrier communication apparatus may be provided with a power supply connector that supplies power to another device. When the another communication apparatus is connected to the power supply connector, the communication mode may be switched.

In the case above, the multi-carrier communication apparatus may be internally provided with a detector that detects a connection of another device to the power supply connector. The detector may detect the connection mechanically or electrically. For mechanical detection, the power supply connector may be provided with a switch that is pushed in when a plug is inserted, for example, so that the detector detects on or off of the switch. For electrical detection, the power supply connector may be connected with a resistor, so that the detector detects a drop in voltage at the resistor.

Figure 2A:
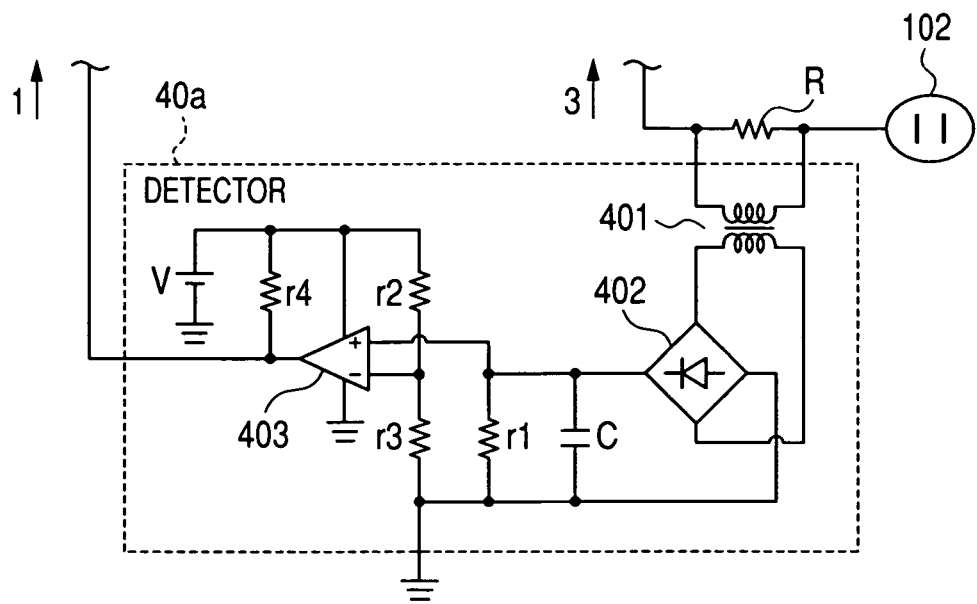
FIGS. 2A and 2B illustrate circuit configuration examples of a detector according to the embodiment.

As shown in FIG. 2A, detector 40a has detection transformer 401 that detects voltages on both sides of resistor R; bridge rectifying circuit 402 that rectifies a signal detected by detection transformer 401; and comparator 403 that compares an output voltage from bridge rectifying circuit 402 with a reference voltage.

One end of DC output from bridge rectifying circuit 402 is grounded, and the other end is connected to a noninverting input terminal of comparator 403. Further, smoothing capacitor C and resistor r1 are connected in parallel to the output from bridge rectifying circuit 402.

Comparator power supply V is connected to a power terminal of comparator 403. An inverting input terminal of comparator 403 is connected to an output point between voltage dividing resistors r2 and r3 connected in series to power supply V, and is supplied with the reference voltage. Digital signal processor 1 is connected to output from comparator 403, and pull-up resistor r4, which pulls up to a power voltage of comparator 403, is also connected thereto.

Thereby, detector 40a outputs a low-level signal when the voltage does not drop at resistor R, or a high-level signal when the voltage drops. Thus, controller 50 can detect that a plug of another apparatus is connected to power supply outlet 102.

As an example of the mechanical detection method of connection to power supply outlet 102, detector 40 is provided with button 102b that protrudes externally from power supply outlet 102 and that is pressed down by an externally inserted plug and the like. Detector 40 detects connection when the button is pressed down.

Figure 2B:
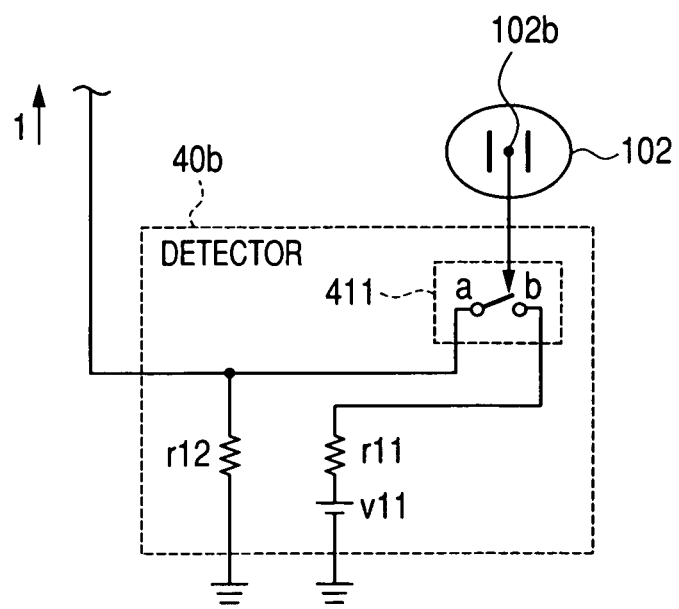

As shown in FIG. 2B, detector 40b has switch 411 linked to button 102b, which is provided protruding externally from power supply outlet 102. Switch 411 has terminals a and b, which are connected when button 102b is pressed down. Terminal b of switch 411 is connected to detection power supply v11 and resistor r11. Terminal a of switch 411 is connected to digital signal processor 1 and to grounded resistor r12.

Thereby, detector 40b outputs a low-level signal when button 102b is not pressed down, or a high-level signal when button 102b is pressed down. Thus, controller 50 can detect that a plug of another apparatus is connected to power supply outlet 102.

Figure 3:
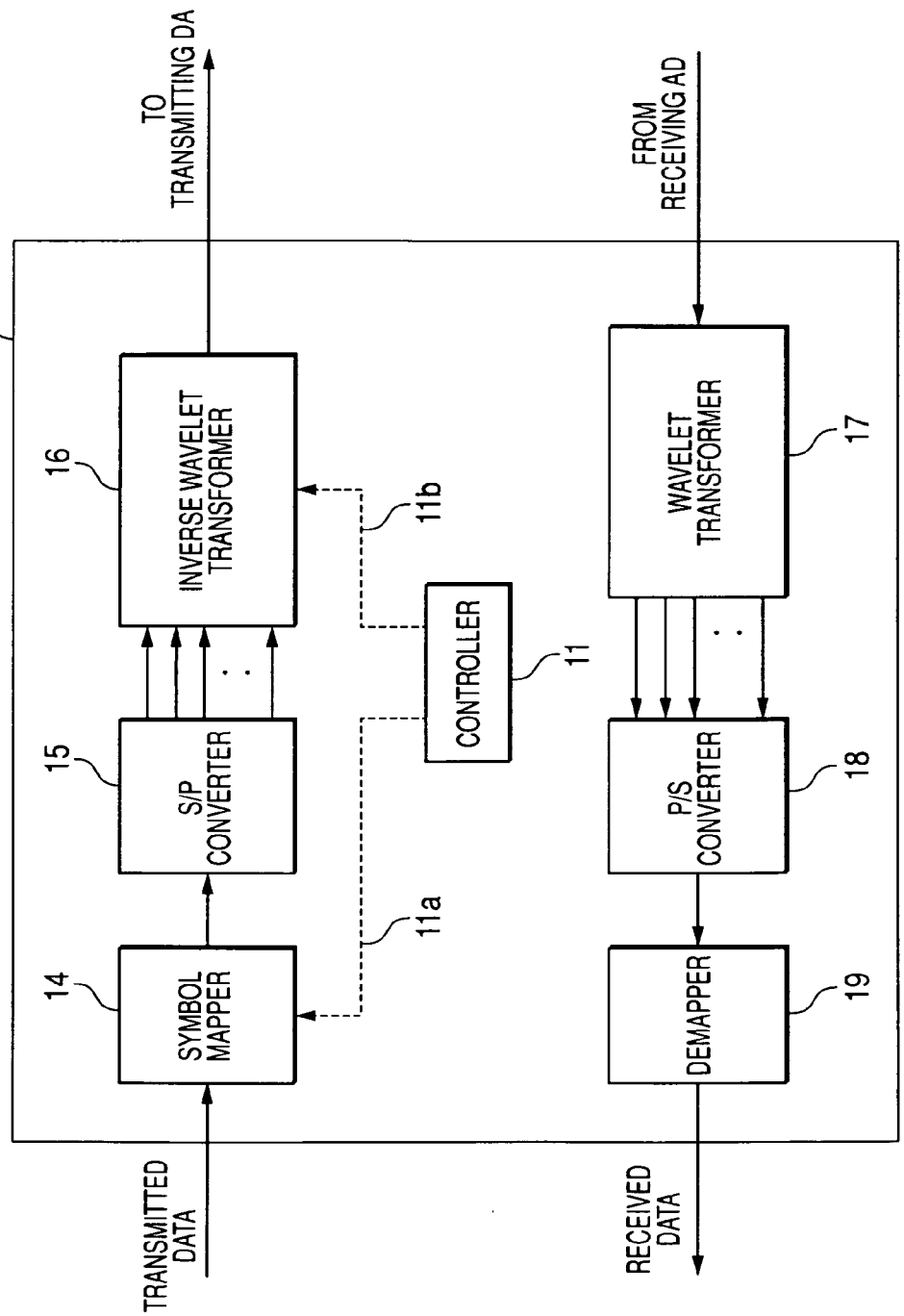
FIG. 3 illustrates a general configuration of a digital signal processor of the multi-carrier communication apparatus according to the embodiment.

FIG. 3 shows a general configuration of digital signal processor 1. In addition to controller 11, digital signal processor 1 includes symbol mapper 14, serial-to-parallel converter (S/P converter) 15, inverse wavelet transformer 16, wavelet transformer 17, parallel-to-serial converter (P/S converter) 18, and demapper 19.

Symbol mapper 14 converts bit data to be transmitted into symbol data, and performs symbol mapping (e.g., PAM: Pulse Amplitude Modulation) based on each of the symbol data. S/P converter 15 converts the mapped serial data into parallel data. Inverse wavelet transformer 16 applies inverse wavelet transform to the parallel data, so as to transform the data into data on a time axis; and generates a series of sample values, which indicate a transmission symbol. The data are sent to transmitting DA converter 21a of analog circuit 2. Control signal 11a changes a modulation scheme in the symbol mapping and a gain, while control signal 11b changes a phase vector in the inverse wavelet transform.

Wavelet transformer 17 applies discrete wavelet transform to received digital data (a series of sample values sampled at the same rate as when transmitted), which is obtained from receiving AD converter 21b of analog circuit 2, so as to transform the data onto a frequency axis. P/S converter 18 converts the parallel data on the frequency axis into serial data. Demapper 19 calculates an amplitude value for each sub-carrier, determines the received signal, and obtains the received data.

Controller 11 also controls elements for processing the received signal, including wavelet transformer 17, parallel-to-serial converter (P/S converter) 18, and demapper 19. When the received digital data are input, carrier detection, synchronized data detection, and the like are performed to obtain the received data. A description on the processes is omitted, however, since the processes are not directly related to the present embodiment.

Analog circuit 2 includes AD/DA conversion circuit 21, transmitting filter 22, transmitting amplifier 23, transmitting switch 24, receiving filter 25, and receiving AGC (Auto Gain Control) amplifier 26. Analog circuit 2 has a transmitter that transmits a transmitted signal having a plurality of carriers; and a receiver that receives a received signal having a plurality of carriers.

AD/DA conversion circuit 21 includes transmitting DA converter 21a and receiving AD converter 21b. Transmitting DA converter 21a converts transmitted digital signal 1a from digital signal processor 1 into a transmitted analog signal. Receiving AD converter 21b converts a received analog signal from receiving AGC amplifier 26 into a received digital signal. Transmitting filter 22 is a low pass filter that removes harmonic noise generated in the DA conversion at transmitting DA converter 21a. Transmitting amplifier 23 amplifies a transmitted power of the transmitted analog signal. A gain thereof may be changed by the control signal from the controller. Transmitting switch 24 switches between the transmitted and received signals, mutes transmitting amplifier 23 in reception, and switches impedance for transmission and reception.

Receiving filter 25 is a bandpass filter that removes noise from a frequency other than a communication frequency band. Receiving AGC amplifier 26 amplifies the received analog signal, so as to adjust the received analog signal to have a voltage appropriate for resolution of receiving AD converter 21b.

Communication transformer 3 insulates a communication signal in a primary circuit on a communication apparatus side and in a secondary circuit on a transmission line side, so as to transmit and receive the signal.

Figure 4:
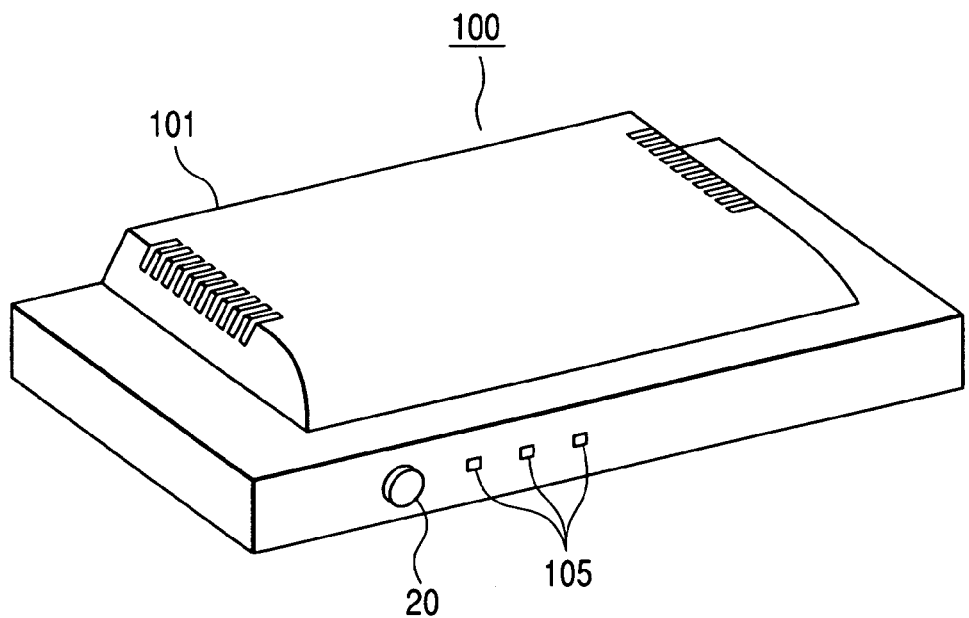
FIG. 4 is an external perspective view illustrating a front side of the communication apparatus according to the embodiment.
Figure 5:
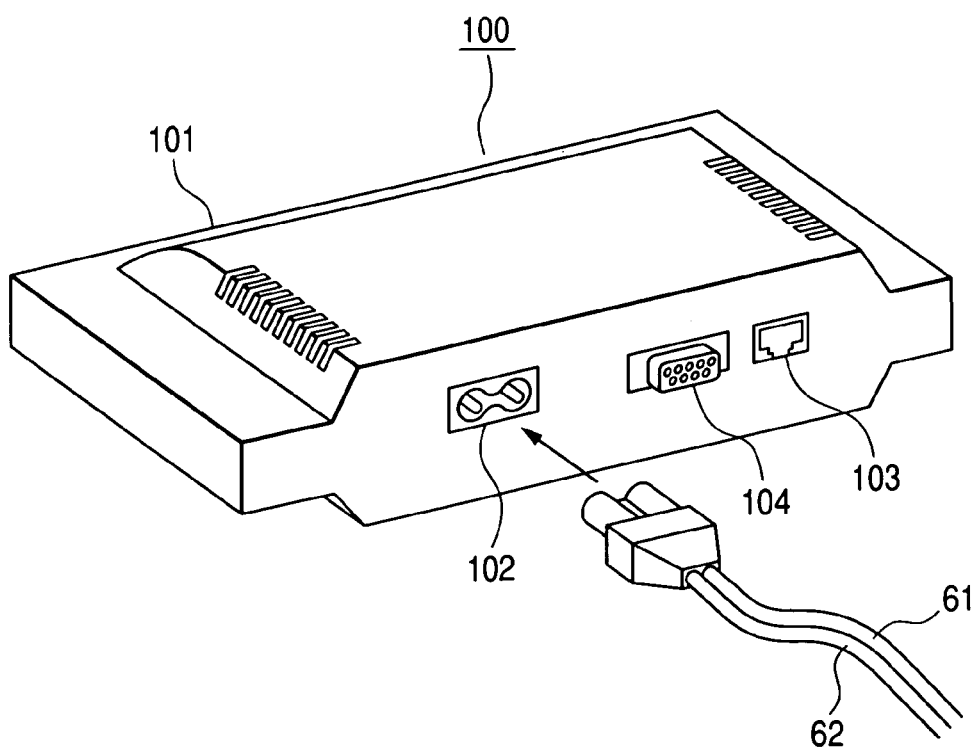
FIG. 5 is an external perspective view illustrating a rear side of the communication apparatus according to the embodiment.

Communication apparatus 100 described above is provided as a modem shown in FIGS. 4 and 5, for example. FIG. 4 is an external perspective view illustrating a front side of the communication apparatus. FIG. 5 is an external perspective view illustrating a rear side of the communication apparatus. Communication apparatus 100 has chassis 101. Provided on the front side of chassis 101 are, as shown in FIG. 4, display 105 having LEDs (Light Emitting Diodes) and the like, and switch 20 formed of a button switch. Provided on the rear side of chassis 101 are, as show in FIG. 5, power connector 102; LAN (Local Area Network) modular jack 103, such as RJ-45 and the like; and D-sub connector 104. To power connector 102, a pair of lines, such as a parallel cable and the like, are connected as shown in FIG. 5. A LAN cable (not shown in the figure) is connected to modular jack 103. A D-sub cable (not shown in the figure) is connected to D-sub connector 104. The modem shown in FIGS. 4 and 5 is described as an example of the communication apparatus. However, the modem does not have to be an exclusive unit, but may be included in an electric apparatus (e.g., a home appliance such as a television set). Further, an electric apparatus having a communication function therein (e.g., a home appliance such as a television set) may be used.

Figure 6:
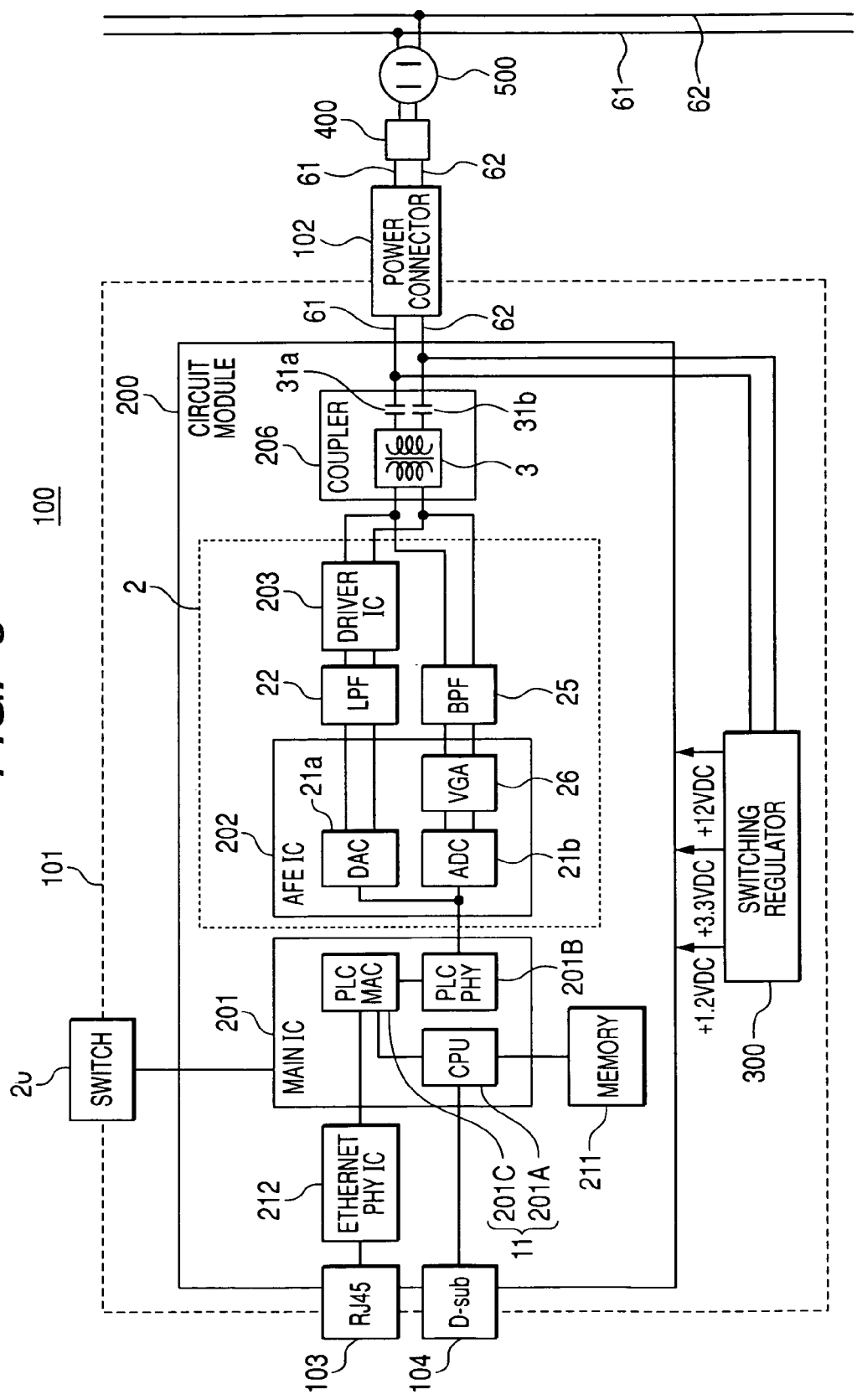
FIG. 6 is a block diagram illustrating a hardware example of the communication apparatus according to the embodiment.

FIG. 6 is a block diagram illustrating a hardware example of the communication apparatus. Communication apparatus 100 has circuit module 200 and switching regulator 300 as shown in FIG. 6. Switching regulator 300 supplies circuit module 200 with a variety of voltages of, for example, +1.2V, 3.3V, and +12V. Circuit module 200 is provided with main IC (Integrated Circuit) 201, AFE IC (Analog Front End IC) 202, low pass filter (transmitting filter) 22, driver IC 203, coupler 206, bandpass filter (receiving filter) 25, memory 211, and Ethernet PHY IC 212. Power connector 102 is connected to the power line, that is, the pair of lines 61 and 62, via plug 400 and outlet 500.

Main IC 201 includes CPU (Central Processing Unit) 201A, PLC MAC (Power Line Communication Media Access Control layer) block 201C, and PLC PHY (Power Line Communication Physical layer) block 201B. CPU 201A is an example of the integrated circuit and mounted with a RISC (Reduced Instruction Set Computer) processor. PLC MAC block 201C controls a MAC layer of the transmitted signal; PLC PHY block 201B controls a PHY layer of the transmitted signal. AFE IC 202 includes DA converter (DAC) 21a, AD converter (ADC) 21b, and variable gain amplifier (VGA) 26. Coupler 206 includes coil transformer 3 and coupling capacitors 31a and 31b.

Digital signal processor 1 in FIG. 1 is provided as main IC 201 shown in FIG. 6. Controller 11 in FIG. 1 is provided as CPU 201A and PLC MAC block 201C shown in FIG. 6. Analog circuit 2 is provided as AFE IC 202, low pass filter (transmitting filter) 22, driver IC 203, and bandpass filter (receiving filter) 25 shown in FIG. 6. FIG. 6 does not include transmitting switch 24 of FIG. 1.

Described below is an overview of operations of the communication apparatus in FIG. 1. In signal transmission, the transmitted digital signal generated in digital signal processor 1 is converted into the analog signal by DA converter 21a of AD/DA conversion circuit 21. Then, the signal passes through transmitting filter 22, transmitting amplifier 23, and transmitting switch 24, and drives the communication transformer. The signal is then output from transmission lines connected to the secondary side of communication transformer 3.

In signal reception, the received signal from transmission lines 61 and 62 passes through communication transformer 3 and is sent to receiving filter 25. A gain of the received signal is then adjusted at receiving AGC amplifier 26. Thereafter, the received signal is converted into the digital signal at receiving AD converter 21b of AD/DA conversion circuit 21, and then converted into the digital data at digital signal processor 1. In the process, transmitting switch 24 is turned off.

Described below are operations for switching the communication mode. The communication apparatus in FIG. 1 has, for example, a first communication mode and at least one second communication mode. The first communication mode is for communication in an unlimited communication range, that is, a maximum communication range determined by performance of the communication apparatus, a transmission status, and the like, whereas the second communication mode is for communication in a narrower communication range than the first communication mode. The communication range of the second communication mode may be fixed or variable.

When the first communication mode is selected, controller 11 controls operations of symbol mapper 14 and inverse wavelet transformer 16, so as to maximize the communication range, which is determined by the performance of the communication apparatus, the transmission status, and the like. Further, controller 11 controls the gain of transmitting amplifier 23 when it is possible.

When a user presses switch 20 in the state, switch 20 generates an input signal and inputs the input signal to main IC 201. Upon receiving the input signal, CPU 201A switches the communication mode to the second communication mode. Then, controller 11 lowers the output level of the transmitted signal output from transmission lines 61 and 62 by controlling: symbol mapper 14; the gain of transmitting amplifier 23; or symbol mapper 14 and the gain of transmitting amplifier 23 at the same time. A lowering level may be fixed or variable. However, controller 11 lowers the output level so as not to lower the communication quality below predetermined quality. The communication quality may be determined by, for example, a transmission rate, an error ratio of a received signal, a packet retry ratio, and the like. The communication quality is detected by controller 11. Since well-known detection methods can be used for the transmission rate, the error ratio of the received signal, the packet retry ratio, and the like, the methods are not described herein.

When the communication mode is switched to the second communication mode, controller 11 controls inverse wavelet transformer 16 so as to change a phase vector, and controls symbol mapper 14 so as to fix a modulation scheme (a tone map). For example, the modulation scheme is fixed to specific multi-level PAM (16PAM or 8PAM) or multi-level QAM (Quadrature Amplitude Modulation). It is optional to change the phase vector and to fix the modulation scheme, and only the output level of the transmitted signal may be lowered.

A network using the communication apparatus described above can apparently separate a communication using a certain communication apparatus from the network. Thereby, a communication between other communication apparatuses can be simultaneously performed over the same transmission line, thus achieving effective use of the network for communication using a plurality of carriers.

Figure 7:
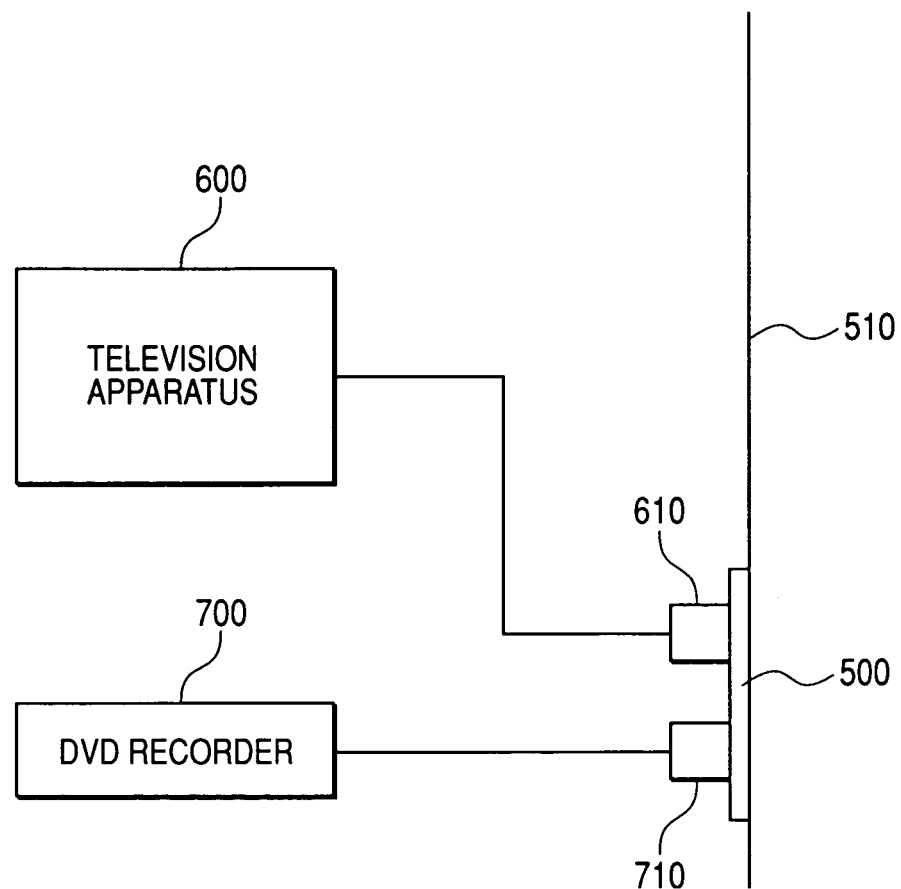
FIG. 7 illustrates a configuration example of a system that uses the multi-carrier communication apparatus according to the embodiment.

Described below is an example of a network configuration using the communication apparatus in FIG. 1. FIG. 7 shows a configuration of a major part of a system wherein multi-carrier communication apparatus (modem) 100, which is connected to an AV (Audio Video) device that inputs and outputs an AV signal, is connected via an indoor power line. The system in FIG. 7 includes television apparatus 600 and DVD recorder 700, whose power plugs 610 and 710 respectively connect to power outlet 500 provided on indoor wall 510. Each of television apparatus 600 and DVD recorder 700 has built-in multi-carrier communication apparatus 100 as shown in FIG. 1, and thus is capable of multi-carrier communication via the power line (not shown in the figure). The AV signal means a signal that contains at least video data and that may include other data, such as still image data and audio data. A compression method may be employed at will for the video data, such as, for example, MPEG (Motion Picture Coding Experts Group) and JPEG (Joint Photographic Coding Experts Group).

Multi-carrier communication apparatus 100 provided in each of television apparatus 600 and DVD recorder 700 has the first communication mode (hereinafter referred to as a normal mode), which allows communication in the unlimited communication range; and the second communication mode. (hereinafter referred to as an AV mode), which allows communication in the narrower communication range than the first communication mode. For AV signal communication between television apparatus 600 and DVD recorder 700, the communication mode is switched to the AV mode. To switch the communication mode, a switch (not shown in the figure) provided on each of television apparatus 600 and DVD recorder 700 may be used. Further, the communication mode may be switched to the AV mode on one of the devices, for example, television apparatus 600, so that television apparatus 600 transmits a communication mode switch signal to DVD recorder 700 in multi-carrier communication via the power line.

Since the AV devices, such as television apparatus 600 and DVD recorder 700, are generally placed nearby, there is no problem to perform communication in a narrow communication range by switching to communication in the AV mode. Thereby, the AV signal in stream communication is transmitted and received in the narrow area where the AV devices are placed, and thus has no impact on communication of another modem connected to the power line.

Figure 8:
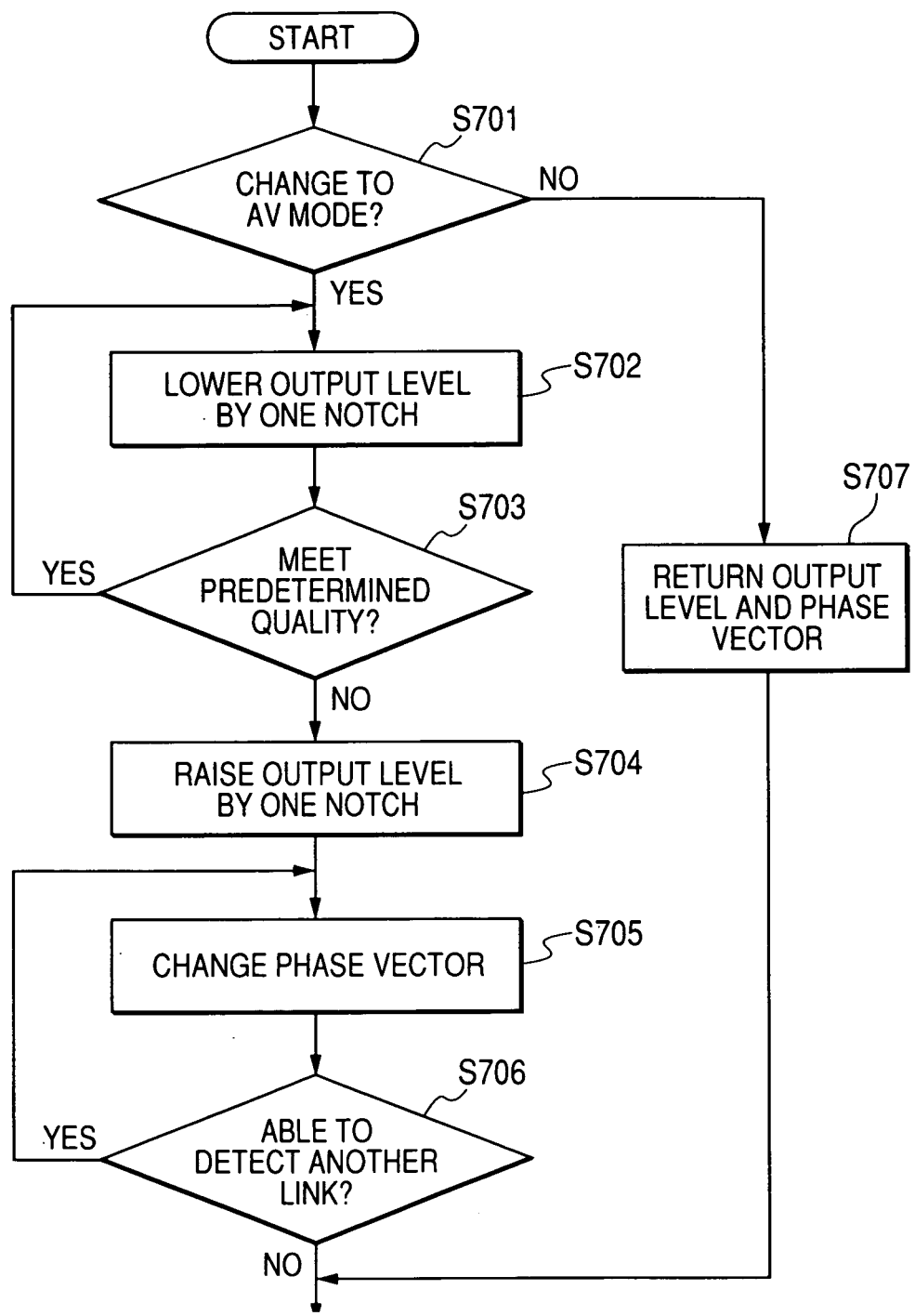
FIG. 8 illustrates an example of an operation flow to switch communication mode of the multi-carrier communication apparatus according to the embodiment.

FIG. 8 shows an example of an operation flow to switch the communication mode, which is performed with the switch.

When the communication mode is switched, controller 11 determines whether the switching is to the AV mode (step S701). When the communication mode is switched to the AV mode, controller 11 lowers the output level of the transmitted signal by one notch (step S702). Controller 11 then determines whether the communication quality in the state meets a predetermined quality (step S703). The communication quality is determined by the transmission rate (whether or not the AV signal can be transmitted at the rate), the error rate of the received signal, the packet retry rate, and the like. The predetermined quality is the lowest value that allows data communication with another multi-carrier communication apparatus. More specifically, the predetermined quality means a threshold that enables AV transmission between television apparatus 600 and DVD recorder 700. When MPEG2 is used as the AV signal compression method, for example, the predetermined quality is a value that ensures a bit rate of 4M bps. Controller 11 repeats step S702 until the communication quality is below the predetermined quality. When the communication quality is below the predetermined quality, controller 11 raises the output level by one notch in step S704. Thereby, the output level of the transmitted signal in the state is the lowest level in a range that meets the predetermined quality. Although it is preferable that the communication quality be set slightly above the threshold, the communication quality may be set exactly at the threshold when the data communication is possible.

In next step S705, controller 11 changes the phase vector that has been used to another phase vector. After changing the phase vector, controller 11 determines whether another link can be detected (i.e., whether a carrier of another link can be detected; step S706). When the another link can be detected, controller 11 returns to step S705 so as to further change the phase vector to a different phase vector. Upon completing setting of the phase vector used for transmitting and receiving the AV signal, controller 11 ends the process related to the communication mode change. As described above, when the communication apparatus is set to the AV mode, the signal can be transmitted and received between the AV devices connected to the communication apparatus while least affecting another communication apparatus. Although described above are operations at default setting, the communication quality is constantly monitored, and when the communication quality falls below the predetermined quality, the output level is raised.

When determining in step S701 that the communication mode is switched to the normal mode, not to the AV mode, controller 11 returns the output level and the phase vector of the transmitted signal to a default status in step S707. In the status, it becomes possible to communicate with a different communication apparatus set to normal mode and connected to the same power line. Further, when switching from the AV mode to the normal mode, storing AV mode setting parameters allows an easy switch back to the AV mode.

In the description above, the output level of the transmitted signal, which is lowered when the communication mode is switched, is changed in accordance with the communication quality. However, the output level may be lowered to a preset fixed output level, which makes it easy for controller 11 to operate. Although the phase vector is changed when switching to the AV mode, the change of the phase vector may be omitted.

Figure 9:
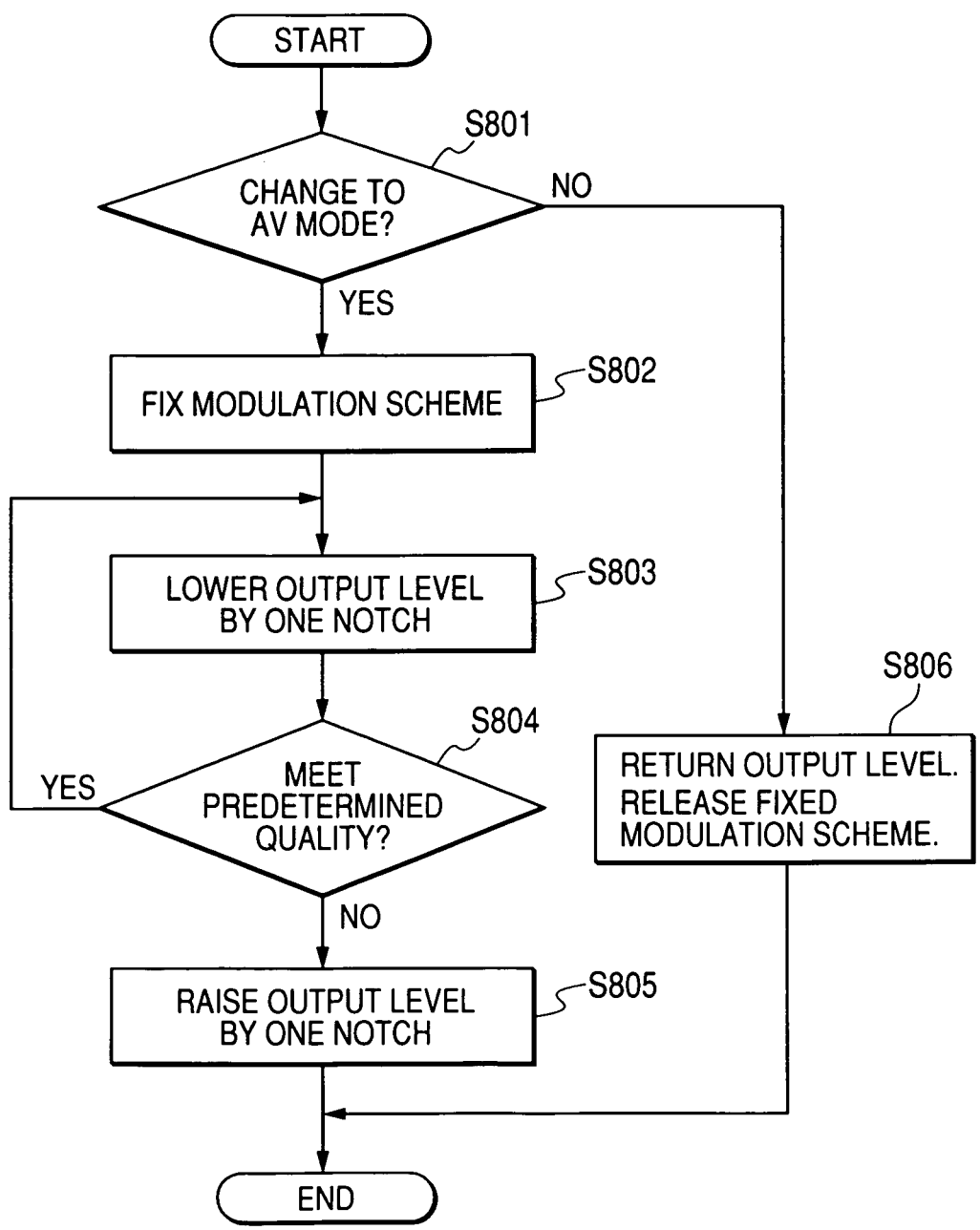
FIG. 9 illustrates another example of the operation flow to switch the communication mode of the multi-carrier communication apparatus according to the embodiment.

FIG. 9 shows another example of the operation flow to switch the communication mode, which is performed with switch 20. In the operation flow, the modulation scheme is also changed when the output level is lowered.

When the communication mode is switched, controller 11 determines whether the switching is to the AV mode (step S801). When the communication mode is switched to the AV mode, controller 11 fixes the modulation scheme to a predetermined modulation scheme (step S802). The fixed modulation scheme is, for example, specific multi-level PAM (16PAM or 8PAM) or multi-level QAM. Fixing the modulation scheme makes it difficult for the communication apparatus to communicate with a communication apparatus that does not employ a modulation scheme common to the communication apparatus.

Then, controller 11 lowers the output level of the transmitted signal by one notch (step S803), and determines whether the communication quality in the state meets a predetermined quality (step S804). The communication quality is determined by the transmission rate (whether or not the AV signal can be transmitted at the rate), the error rate of the received signal, the packet retry rate, and the like. The predetermined quality indicates the threshold that allows AV transmission. Controller 11 repeats step S803 until the communication quality falls below the predetermined quality. When the communication quality falls below the predetermined quality, controller 11 raises the output level by one notch in step S805. Thereby, the output level of the transmitted signal in the state is the lowest level in a range that meets the predetermined communication quality.

When determining in step S801 that the communication mode is switched to the normal mode, not to the AV mode, controller 11 returns the output level and the modulation scheme of the transmitted signal to the default status in step S806. In the status, it becomes possible to communicate with a communication apparatus set to normal mode and connected to the same power line. Further, when switching from the AV mode to the normal mode, storing AV mode setting parameters allows an easy switch back to the AV mode.

The communication apparatus does not merely lower the output level of the signal, but also lowers the output level in accordance with an input signal. As a result, since users can change the output level by using the input signal, users can select a range of a power line network.

In the description above, the output level of the transmitted signal, which is lowered when the communication mode is switched, is changed in accordance with the communication quality. However, the output level may be lowered to a preset fixed output level, which makes it easy for controller 11 to operate.

Figure 10:
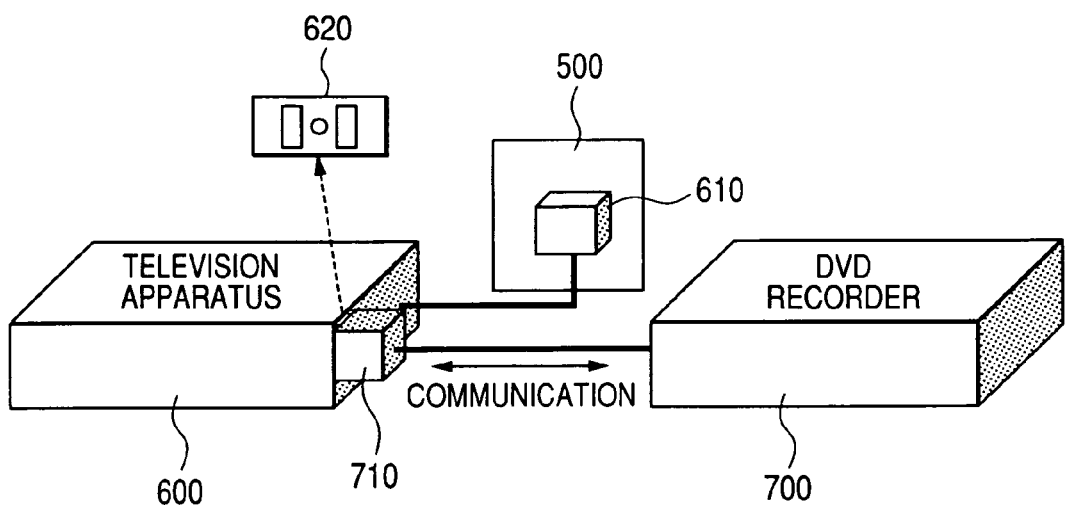
FIG. 10 illustrates another configuration example of the system that uses the multi-carrier communication apparatus according to the embodiment.

The system shown in FIG. 7 has a configuration wherein television apparatus 600 and DVD recorder 700 are connected to the adjacent outlet. The system, however, may be configured having a different connection. FIG. 10 shows another configuration example of a major part of the system wherein the multi-carrier communication apparatus (modem), which is connected to the AV device that inputs and outputs the AV signal, is connected via the indoor power line.

In the system of FIG. 10, television apparatus 600 has power supply connector 620 that supplies power to another apparatus, and power plug 710 of DVD recorder 700 is connected to power supply connector 620. Power plug 610 of television apparatus 600 is connected to power outlet 500 provided on indoor wall 510. Television apparatus 600 and DVD recorder 700 are the same as the system of FIG. 7 in that each of television apparatus 600 and DVD recorder 700 is internally provided with the multi-carrier communication apparatus as shown in FIG. 1, and thus is capable of multi-carrier communication via the power line (not shown in the figure).

Television apparatus 600 detects the connection of the power plug of the another device to power supply connector 620, and then switches the communication mode to the AV mode. The connection of the power plug may be detected by a connection detection switch provided on power supply connector 620, or by a voltage drop at the power supply connector. When the connection to power supply connector 620 switches the communication mode to the AV mode, it is preferable to shield a modem signal via the power supply connector from flowing into outlet 500.

Figure 11:
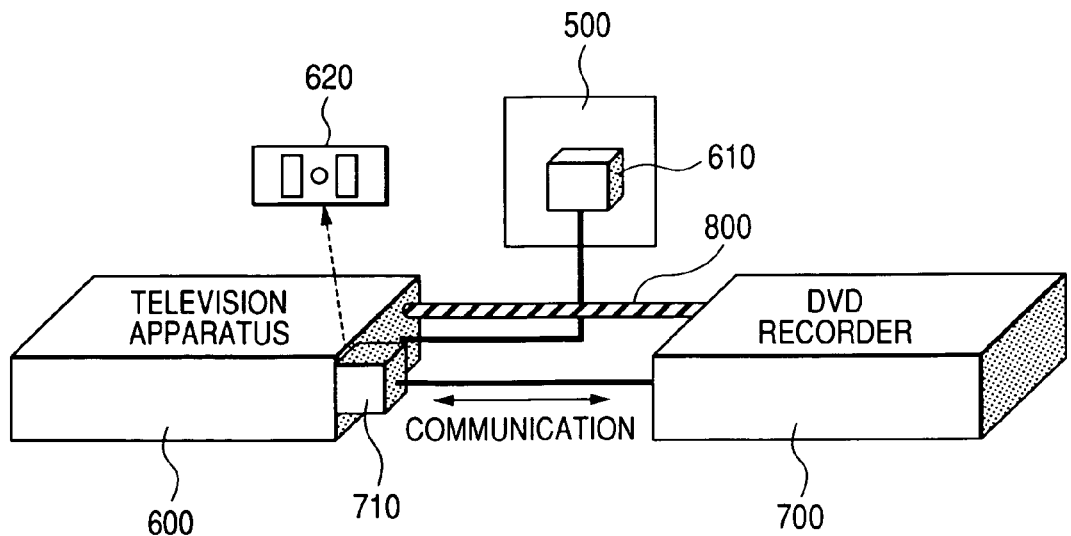
FIG. 11 illustrates further another configuration example of the system that uses the multi-carrier communication apparatus according to the embodiment.

In the system of FIG. 7, the power line is an only communication path for television apparatus 600 and DVD recorder 700. As with an ordinary AV system, another communication path may be provided between television apparatus 600 and DVD recorder 700. FIG. 11 shows a configuration example of such system.

The system shown in FIG. 11 performs communication on the power line having a similar connection to the system shown in FIG. 10. Television apparatus 600 and DVD recorder 700 are further connected via coaxial cable 800, which is an example of another transmission line. Thereby, the AV signal can be transmitted and received via the power supply connector and the power line, and further via coaxial cable 800. In the communication via coaxial cable 800, a control signal, which includes a setting and the like for transmitting and receiving the AV signal, can be transmitted and received via the power line, and a stream signal of the AV signal can be transmitted and received via coaxial cable 800. Further, the power supply connector may be used only for switching to the AV mode, and other processing may be performed via coaxial cable 800, the other processing including all transmission and reception of the control signal that contains the setting and the like for transmitting and receiving the AV signal and of the stream signal of the AV signal.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-270157 filed on Sep. 16, 2005, entire content of which is expressly incorporated by reference herein.

What is claimed is:

1. A communication apparatus that transmits a signal to another communication apparatus through a power line, the communication apparatus comprising:

a digital circuit that modulates digital data into a signal having a predetermined output level;

an analog circuit that converts the signal from a digital format to an analog format, and transmits the converted signal;

a transmission mode configurator that configures either a first transmission mode which does not limit a range of communication or a second transmission mode which limits the range of communication; and an integrated circuit that controls at least one of the digital circuit and the analog circuit to lower the predetermined output level of the signal in accordance with the transmission mode configured by the transmission mode configurator.

2. The communication apparatus according to claim 1, further comprising:

a switch that generates an input signal to control a configuration implemented by the transmission mode configurator.

3. The communication apparatus according to claim 1, further comprising:

a detector that detects that the communication apparatus connects to said another communication apparatus.

4. The communication apparatus according to claim 3, further comprising:

an outlet to which said another communication apparatus is connectable, wherein the detector detects said another communication apparatus connects to the communication apparatus through the outlet.

5. The communication apparatus according to claim 4, wherein the outlet is connectable to said another communication apparatus through the power line.

6. The communication apparatus according to claim 1, wherein the analog circuit includes an amplifier, and the integrated circuit changes a gain of the amplifier to lower the predetermined output level of the signal in accordance with an input signal.

7. The communication apparatus according to claim 1, wherein the integrated circuit controls the digital circuit to change a gain of the signal to lower the predetermined output level of the signal in accordance with the transmission mode configured by the transmission mode configurator.

8. The communication apparatus according to claim 1, wherein the signal has a plurality of sub-carriers, and the integrated circuit changes a phase vector that shows a phase rotation amount of each of the plurality of sub-carriers on the basis of a detection of another link.

9. The communication apparatus according to claim 1, wherein the integrated circuit fixes a modulation scheme of the signal, and the digital circuit modulates the digital data into the signal with the fixed modulation scheme.

10. The communication apparatus according to claim 1, wherein the signal includes at least video data.

11. The communication apparatus according to claim 1, wherein the integrated circuit controls at least one of the digital circuit and the analog circuit to lower the predetermined output level of the signal in the second communication mode than that in the first communication mode.

12. The communication apparatus according to claim 1, wherein:

the first transmission mode does not limit a distance of communication and the second transmission mode limits the distance of communication.

13. A communication method to transmit a signal from a communication apparatus to another communication apparatus through a power line, the communication method comprising:

modulating digital data into a signal having a predetermined output level;

converting, from a digital format to an analog format, the signal modulated from the digital data;

transmitting the signal converted to the analog format;

configuring either a first transmission mode which does not limit a range of communication or a second transmission mode which limits the range of communication; and lowering the predetermined output level of the signal in accordance with the transmission mode configured by the configuring of either the first transmission mode or the second transmission mode.

14. The communication method according to claim 13, further comprising:

generating an input signal by a switch to control the configuring of either the first transmission mode or the second transmission mode.

15. The communication method according to claim 13, further comprising:

detecting that the communication apparatus connects to said another communication apparatus.

16. A communication apparatus that transmits a signal to another communication apparatus through a power line, the communication apparatus comprising:

a digital circuit that modulates a digital data into a signal having a predetermined output level;

an analog circuit that converts the signal from a digital format to an analog format and transmits the converted signal;

a transmission mode configurator that configures either a normal transmission mode or an AV transmission mode; and an integrated circuit that controls at least one of the digital circuit and the analog circuit to lower the predetermined output level of the signal in accordance with the transmission mode configured by the transmission mode configurator; wherein the normal transmission mode does not limit a distance of communication and the AV transmission mode limits the distance of communication.

* * * * *